No. 752,323. Patented February 16, 1904.

UNITED STATES PATENT OFFICE.

RUDOLF BERENDES, OF ELBERFELD, GERMANY, ASSIGNOR TO FARBENFABRIKEN OF ELBERFELD CO., OF NEW YORK, N. Y., A CORPORATION OF NEW YORK.

SENSITIZING DYESTUFF.

SPECIFICATION forming part of Letters Patent No. 752,323, dated February 16, 1904.

Application filed August 19, 1903. Serial No. 170,051. (Specimens.)

*To all whom it may concern:*

Be it known that I, RUDOLF BERENDES, doctor of philosophy, chemist, residing at Elberfeld, Germany, (assignor to the FARBENFABRIKEN OF ELBERFELD COMPANY, of New York,) have invented a new and useful Improvement in new Sensitizing Dyestuffs; and I do hereby declare the following to be an exact and clear description of my invention.

My invention relates to the production of a new class of dyestuffs which are remarkable on account of their important property to impart greater sensibility to photographic emulsions for distinct colors of the spectrum. They are therefore of great importance for the manufacture of orthochromatic plates, films, or the like.

The process for the production of these new dyestuffs consists in causing caustic alkalies or alkaline earths to act on the ammonium compounds which can be prepared by treating quinaldin, the homologues or substituted derivatives thereof, with dialkyl sulfates, such as dimethyl sulfate, diethyl sulfate, or the like. One can also employ a mixture of the above-mentioned ammonium bases with one another or with the corresponding derivatives of quinolin, which can be obtained by treating quinolin with dialkyl sulfates.

The new dyestuffs contain sulfur and are dark crystals having a metallic luster. They are soluble in chloroform, acetone, and water with a violet color and insoluble in ligroin and ether.

In carrying out my new process practically I can proceed as follows, the parts being by weight: A mixture of two hundred and eighty-six parts of quinaldin with three hundred and eight parts of diethyl sulfate is heated on a water-bath until the formation of the soluble ammonium compound of the formula

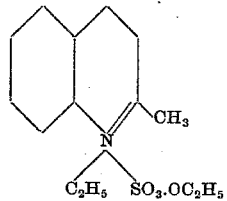

is completed. To the resulting body, mixed with five times its quantity of alcohol and heated on a water-bath, fifty-seven parts of a ten-per-cent. aqueous solution of potassium hydroxid are slowly added. The resulting red solution is evaporated to dryness. The residue thus obtained is pulverized and extracted with ether in order to remove therefrom resinous by-products. The new dyestuff thus produced is then crystallized from alcohol. It is thus obtained in the shape of dark-red crystals having a metallic luster, soluble in water, chloroform, and alcohol with a violet color and insoluble in ether, benzene, and ligroin.

The process proceeds in an analogous manner if instead of quinaldin its homologues or substituted derivatives—such as the three isomeric toluquinaldins, (see *Berichte der Deutschen Chemischen Gesellschaft*, Vol. 16, page 2469,) chloro or bromo quinaldin, or the like—are used. Dimethyl sulfate or other dialkyl sulfates can also be substituted for diethyl sulfate.

Having now described my invention and in what manner the same is to be performed, what I claim as new, and desire to secure by Letters Patent, is—

1. The herein-described new dyestuffs, being derivatives of quinaldin, which are dark crystals of a metallic luster, soluble in chloroform, acetone and water with a violet color, being insoluble in ligroin and ether, and possessing the remarkable property of imparting greater sensibility to photographic emulsions for distinct colors of the spectrum substantially as hereinbefore described.

2. The herein-described new dyestuff obtainable by treating with caustic alkalies the ammonium compound prepared by the action of diethyl sulfate on quinaldin, which dyestuff forms dark-red crystals having a metallic luster, soluble in water, chloroform and alcohol with a violet color, being insoluble in ether, benzene and ligroin and possessing the remarkable property of imparting greater sensibility to photographic emulsions for distinct colors of the spectrum, substantially as hereinbefore described.

In testimony whereof I have signed my name in the presence of two subscribing witnesses.

RUDOLF BERENDES.

Witnesses:
OTTO KÖNIG,
J. A. RITTERSHAUS.